United States Patent

Gerenser et al.

[11] Patent Number: 5,592,845
[45] Date of Patent: Jan. 14, 1997

[54] PROCESS FOR PRODUCING BAR FLATS

[75] Inventors: Duane Gerenser, New Hope; Reinhard F. Kuffel, Washington Crossing, both of Pa.; Donald Jorgensen, Hamilton Square, N.J.

[73] Assignee: Pennington Metals, Inc., Trenton, N.J.

[21] Appl. No.: 450,808

[22] Filed: May 25, 1995

Related U.S. Application Data

[63] Continuation of Ser. No. 73,751, Jun. 8, 1993, abandoned.

[51] Int. Cl.$^6$ .............................. B21B 1/28; B21B 15/00
[52] U.S. Cl. .................. 72/161; 72/203; 72/235; 72/366.2
[58] Field of Search .......................... 72/129, 130, 160, 72/161, 162, 199, 203, 204, 234, 235, 366.2; 409/297, 298, 301, 303

[56] References Cited

U.S. PATENT DOCUMENTS

| | | | |
|---|---|---|---|
| 186,561 | 1/1877 | Hickman | 72/235 |
| 973,571 | 10/1910 | Shuster | 72/160 |
| 2,318,732 | 5/1943 | Yoder | 409/303 |
| 2,353,289 | 7/1944 | Bennewitz | 72/235 |
| 2,503,824 | 4/1950 | Hunter et al. | 72/203 |
| 2,619,881 | 12/1952 | Dudley | 409/303 |
| 3,254,568 | 6/1966 | Pickard . | |
| 3,267,252 | 8/1966 | Morris | 72/160 |
| 3,416,347 | 12/1968 | Walsh et al. | 72/199 |
| 3,494,253 | 2/1970 | Hood et al. | 409/138 |
| 3,688,548 | 9/1972 | Kawaguchi et al. | 72/234 |
| 3,724,251 | 4/1973 | Wegner | 72/199 |
| 3,768,293 | 10/1973 | Ruesch | 72/203 |
| 3,875,785 | 4/1975 | Anisimov et al. | 72/340 |

FOREIGN PATENT DOCUMENTS

| 1168847 | 10/1969 | United Kingdom | 72/204 |
|---|---|---|---|

*Primary Examiner*—Lowell A. Larson
*Assistant Examiner*—Thomas C. Schoeffler
*Attorney, Agent, or Firm*—Mathews, Woodbridge & Collins

[57] ABSTRACT

This invention relates to a novel method and apparatus for producing cold finished bar flats with improved bright surface condition. The bar flats are produced by a rolled method in a continuous economical process. A strip is fed to a shaving apparatus for removing burrs formed during slitting. Cold finishing rollers perform cold reduction of the strip to a predetermined thickness. Edge conditioning rollers smooth the edges of the strip and size the strip to a predetermined width. Preferably, the edge conditioning rollers alternate with the cold reduction rollers.

4 Claims, 6 Drawing Sheets

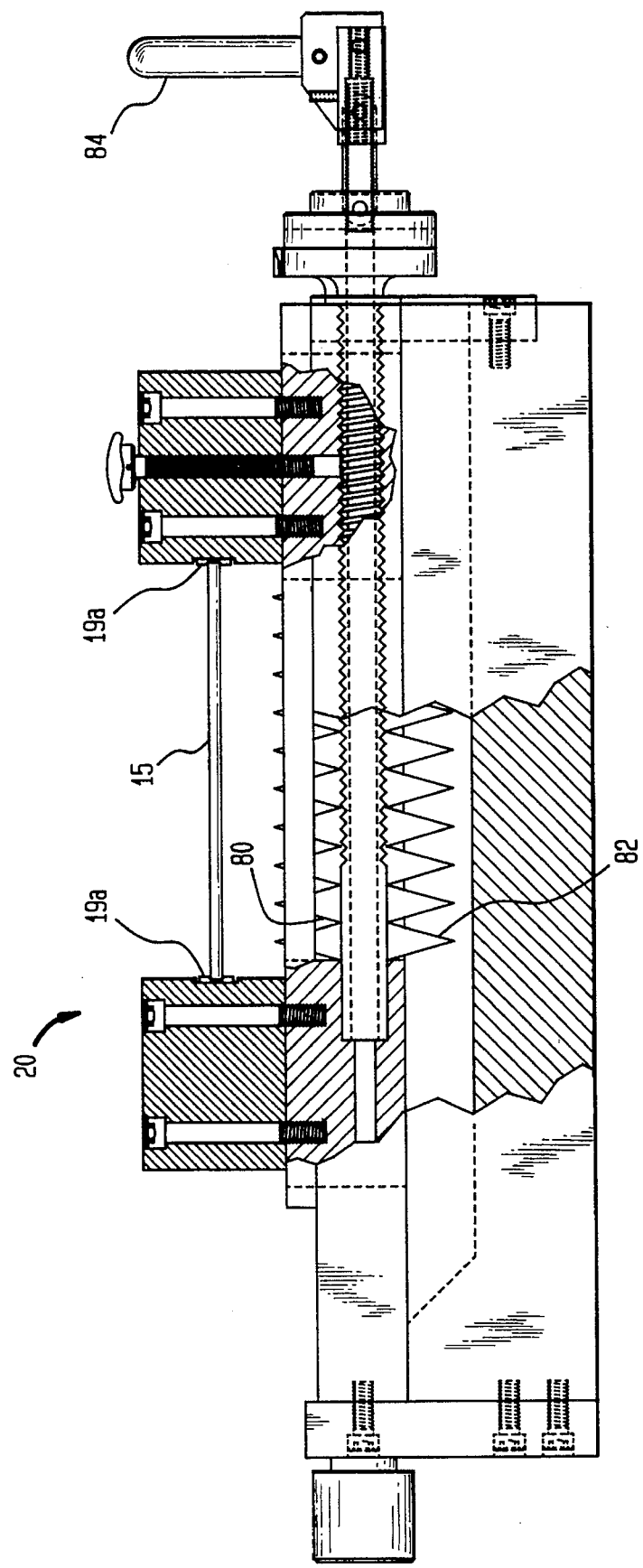

PROCESS FOR PRODUCING BAR FLATS

This application is a continuation of application Ser. No. 08/073,751, filed Jun. 8, 1993, now abandoned.

BACKGROUND OF THE INVENTION

1. Field of the Invention

This invention relates to an apparatus and method for producing bar flats by a rolled process for improved productivity and economy as well as with improved edge and surface properties.

2. Description of the Related Art

A bar flat is a strip of metal of a predetermined length and thickness. The top and bottom portions of the bar flat as well as the edges have a smooth finish. In a number of industries, bar flats of various thicknesses and widths are employed in the fabrication of products in which a smooth surface finish and. dimensional accuracy of the bar is essential. It is known that a bar flat having a smooth surface can be produced by drawing material through a carbide die.

A cold finished bar flat is defined as a bar having cold work surfaces for an improved bright smooth surface finish and having a predetermined width and thickness tolerances as defined under ASTM standards A108 and A29.

U.S. Pat. No. 3,875,785 describes a die for reducing and sizing rolled sections of various shapes from aluminum, steel, titanium and other alloys to form a cold reduced bar flat. Upper and lower plates move towards each other and the rolled section is drawn through the die. After leaving the die, the lateral sides of the section are trimmed by a pair of knives to the dimensions of a finished article. The use of a die has the shortcoming that internal stresses are formed in the articles of manufacture by the drawing action of the die. Prior art drawn methods have the additional shortcoming of requiring complicated machinery which results in high manufacturing costs.

Another practice for forming metal strips of a desired width is to cut the strip from a larger metal sheet. Metal strips obtained in this manner have burrs and sharp edges which are undesirable. U.S. Pat. No. 3,724,251 describes an apparatus for edge conditioning strips cut from a metal sheet. The metal sheet is passed through a slitter for severing the sheet into strips of a desired width. A number of pairs of opposing rollers are disposed adjacent the edges of the strip. Sharp corners and burrs are rolled from the edges of the strip. However, this patent has the shortcoming that dimension accuracy of the bar flat to cold finished standards would not be obtained by this method.

U.S. Pat. No. 3,768,293 describes an apparatus for conditioning the edges of metal strip material. Material is delivered from a web slitting apparatus to edge conditioning rollers. The edge conditioning rollers are grooved rollers arranged in pairs along the edges of the strip. The strip is drawn through cutter blades for cutting formations into the strips. Edge finishing rollers apply pressure to round and smooth the cut edges.

Of possible general relevance are U.S. Pat. Nos. 3,254, 568 and 3,416,347 directed to edge conditioning of metal strips.

It is desirable to provide an apparatus for providing a combination of cold rolling and edge conditioning to produce desired smoothness and dimensional accuracy of cold finished bar flats by the rolled method without undue internal stress to the bar. It is also desirable to provide a cold finished bar flat with a bright smooth surface finish which is easily manufactured by the rolled method with improved productivity and economy.

SUMMARY OF THE INVENTION

Briefly described, the invention comprises an apparatus for producing cold finished bar flats having improved smoothness without having undue internal stress in the bar. A strip of a predetermined width from a slitting apparatus is fed into a shaving apparatus for removing burrs and uneven fractured surfaces caused during the slitting operation. Cold finishing rollers perform cold reduction of the strip to a predetermined thickness. Edge conditioning rollers are disposed between the cold finishing rollers for shaping the edges of the strip and for sizing the strip to a predetermined width. The strip can be cut to form a bar of a predetermined length. The edge conditioning rollers and cold finishing rollers provide bright and smooth surfaces and edges of the bar without producing internal uneven stresses the bar.

Leveling operations can be used before and after cold finishing of the strip for straightening the strip. A straightener apparatus can be employed after cold finishing of the strip to further straighten the strip. Preferably, two pairs of edge conditioning rollers alternate between three pairs of cold finishing rollers for cold finishing the strip. The invention will be further understood by reference to the following drawings,

BRIEF DESCRIPTION OF THE DRAWINGS

FIG. 6 is a vertical cross-sectional view of a shaving apparatus used in the present invention.

DETAILED DESCRIPTION OF INVENTION

During the course of this description like numbers will be used to identify like elements according to the different figures which illustrate the invention.

Figure 1:
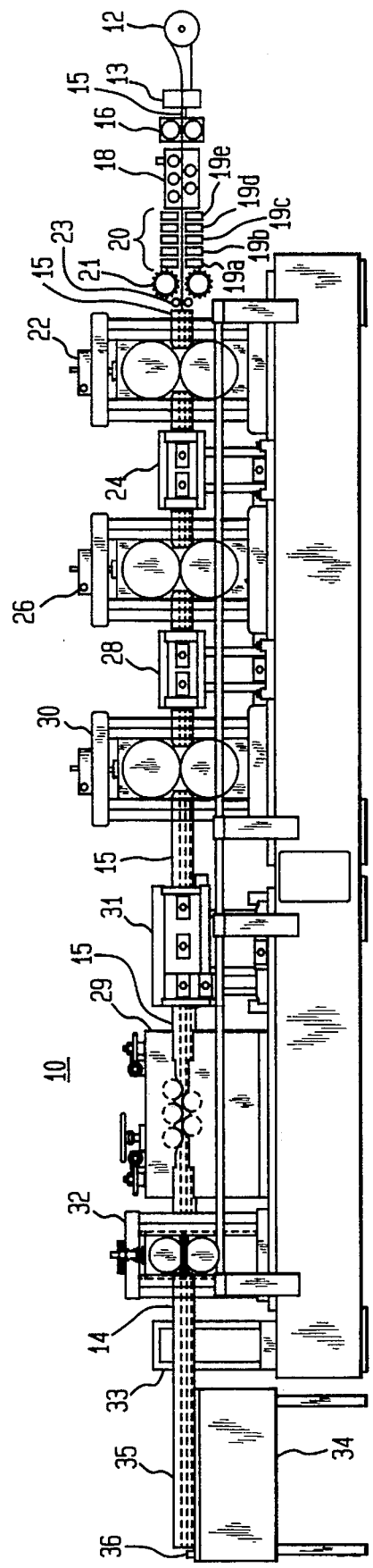
FIG. 1 is a side elevational view of an apparatus for producing bar flats of the present invention.

FIG. 1 is a side elevational view of an apparatus for producing bar flats 10 in accordance with the teachings of the present invention. A supply coil of strip metal 12 was passed through a conventional slitting mechanism (not shown). Preferably, strip metal 12 is formed of carbon steel, stainless steel, brass or aluminum. Strip metal 12 was cut into strips 15 of a predetermined width. Preferably, strips 15 have a width in the range of about 0.5 to about 12 inches and a thickness in the range of about 0,080 to about 0.5 inches. Most preferably, strips 15 have a thickness in the range of 0.125 to 0.250 inches and a width in the range of 0.5 to 6 inches. Strip 15 typically has a thin sliver of material projecting outwardly from the strip. These thin slivers are often razor sharp and can be defined as "burrs". The side edges of strip 15 can also be rough and uneven due to slitting fracture. Strip metal 12 is fed to welding apparatus 13 to be joined with exiting strip 15.

Strip 15 is fed between a pair of pinch rollers 16 to leveling apparatus 18. Shaving apparatus 20 receives strip 15. Shaving apparatus 20 removes burrs and uneven fractures produced by slitting apparatus. Shaving apparatus 20 includes five pairs of knife blades 20a–20e with one knife of the pair positioned on either side of the edge of strip 15.

Horizontal brushes 21 contact strip 15 for removing shavings and other contaminants from strip 15. Preferably, brushes 21 are rotating steel brushes.

Guide rollers 23 direct strip 15 to cold reduction stand 22. Cold reduction is used for surface conditioning of strip 15. Cold reduction is performed with pairs of cold mill reduction stands 22, 26 and 30. Cold mill reduction stands 22, 26 and 30 perform cold reduction of strip 15 to achieve a predetermined thickness of strip 15. Cold mill reduction stands 22, 26 and 30 provide a bright and smooth surface finish to strip 15.

Edge conditioning is performed with pairs of edge conditioning rollers 24 and 28. Edge conditioning rollers 24 and 28 shape and smooth side edges of strip 15. Edge conditioning rollers 24 and 28 can size the width of strip 15 to a predetermined value. Preferably, edge conditioning roller 24 is positioned between cold mill reduction stands 22 and 26 and edge conditioning roller 28 is positioned between cold finishing rollers 26 and 30. The alternation of edge conditioning rollers 24 and 28 with cold finishing rollers 22, 26 and 30 provides a bright smooth surface finish on all horizontal and vertical surfaces, without producing undue stresses, and reduces the thickness and width of strip 15.

Straightening apparatus 31 straightens strip 15 in a longitudinal direction with pairs of rollers positioned adjacent to either side of strip 15.

Leveling apparatus 29 is positioned after straightening apparatus 31. Leveling apparatus 29 straightens strip 15 in a horizontal direction. Leveling apparatus 29 is similar to leveling apparatus 18. Guide rollers 32 feed strip 15 from leveling apparatus 29 to severing apparatus 33. Strip 15 travels along table 34 until contacting sensor 36. Sensor 36 activates severing apparatus 33 for cutting strip 15 into a bar flat of a predetermined length. Preferably, the length of the bar flat is between about 4 feet to about 24 feet. Severing apparatus 33 can include travelling shear knives for cutting strip 15 at a predetermined length to form bar flat 35.

Figure 2:
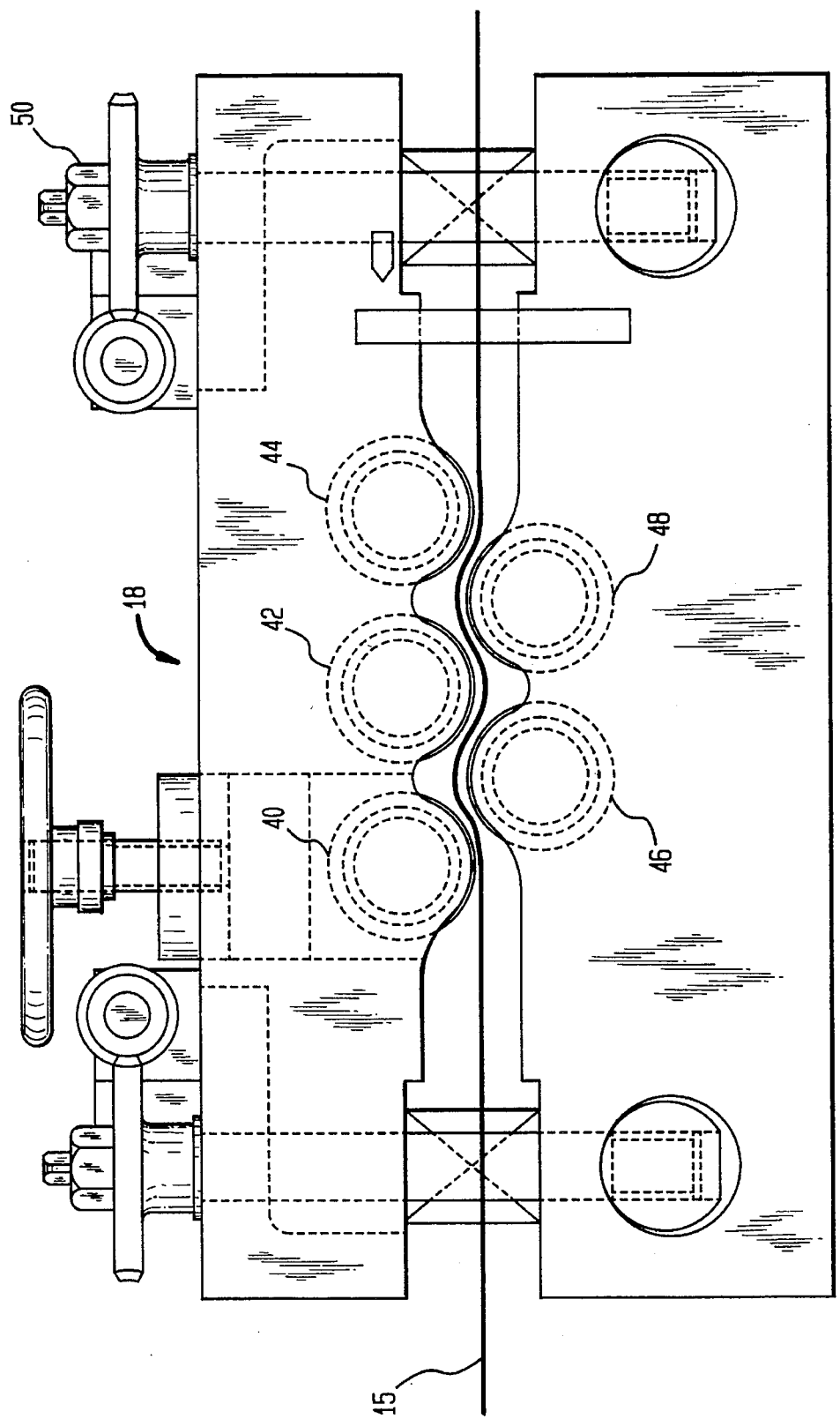
FIG. 2 is a cross-sectional view of a leveling apparatus used in the present invention.

FIG. 2 is a cross sectional view of leveling apparatus 18. Top leveling rollers 40, 42 and 44 are positioned above strip 15 and bottom leveling rollers 46 and 48 are positioned below strip 15. Adjusting screws 50 can be used to increase or decrease the distance between top rollers 40, 42 and 44 and bottom rollers 46 and 48. Leveling apparatus 29 can have the same configuration as leveling apparatus 18. It will be appreciated that additional top and bottom leveling rollers could be used in leveling apparatus 18 and 29.

Figure 3:
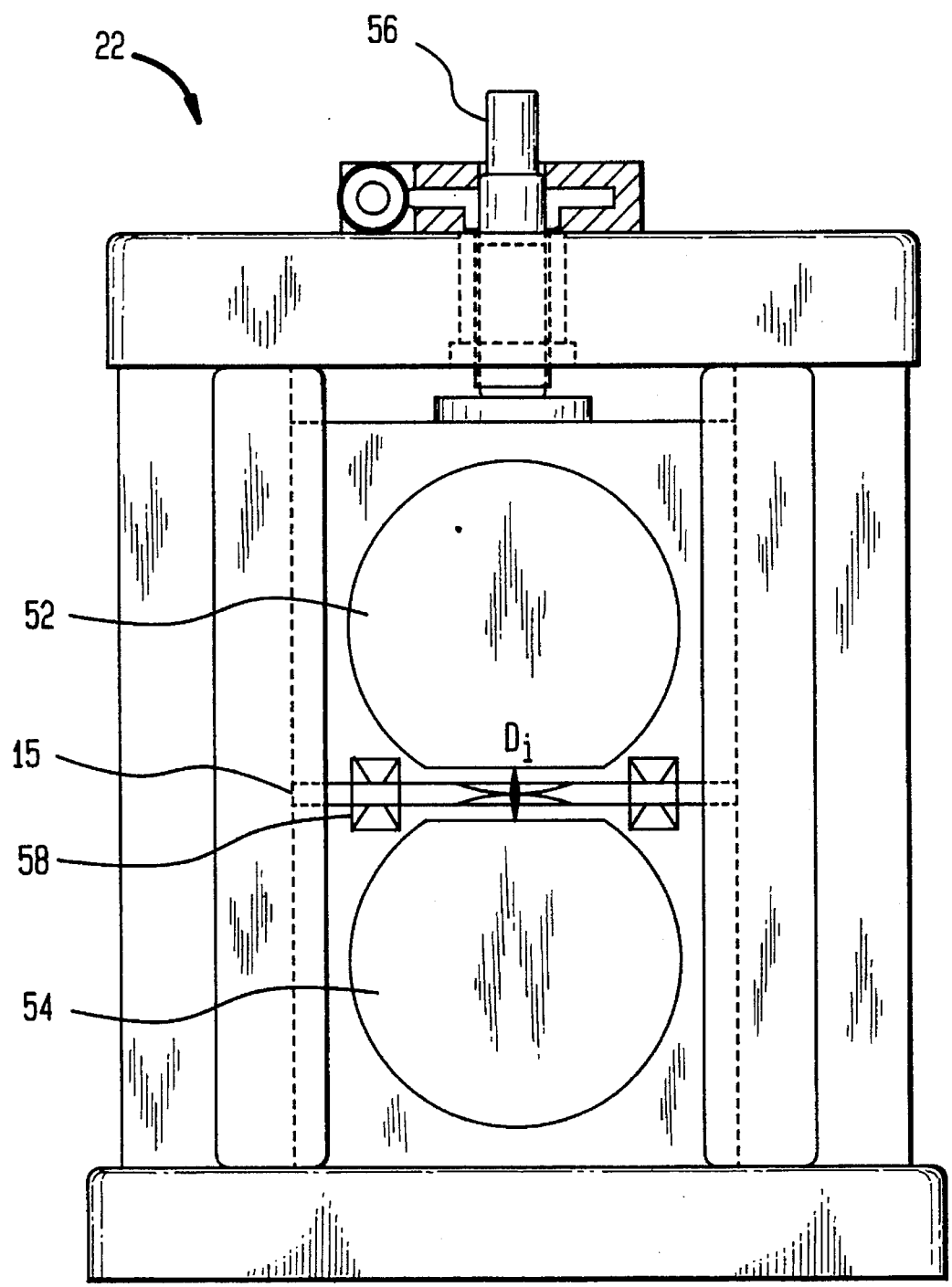
FIG. 3 is a side elevational view of a cold finishing roller apparatus used in the present invention.

FIG. 3 illustrates a side elevational view of cold mill reduction stand 22. Top cold roller 52 contacts the upper surface of strip 15 and bottom cold roller 54 contacts the lower surface of strip 15. Adjusting screw 56 adjusts distance $D_i$ between top cold roller 52 and bottom cold roller 54. Spring 58 biases top finishing roller 52 and bottom finishing roller 54 at distance $D_i$. The same configuration of cold finishing rollers 22 can be used for cold finishing rollers 26 and 30. Preferably, top cold roller 52 and bottom cold roller 54 are coated with a coolant to prevent the roller from cracking due to heat stress. An example of a coating useful for practice of this invention is manufactured by Springer Company, Zelionople, Pa. as Springer Coat. A carbide coating could also be used on cold rollers 52, 54 for preventing cracking.

Figure 4:
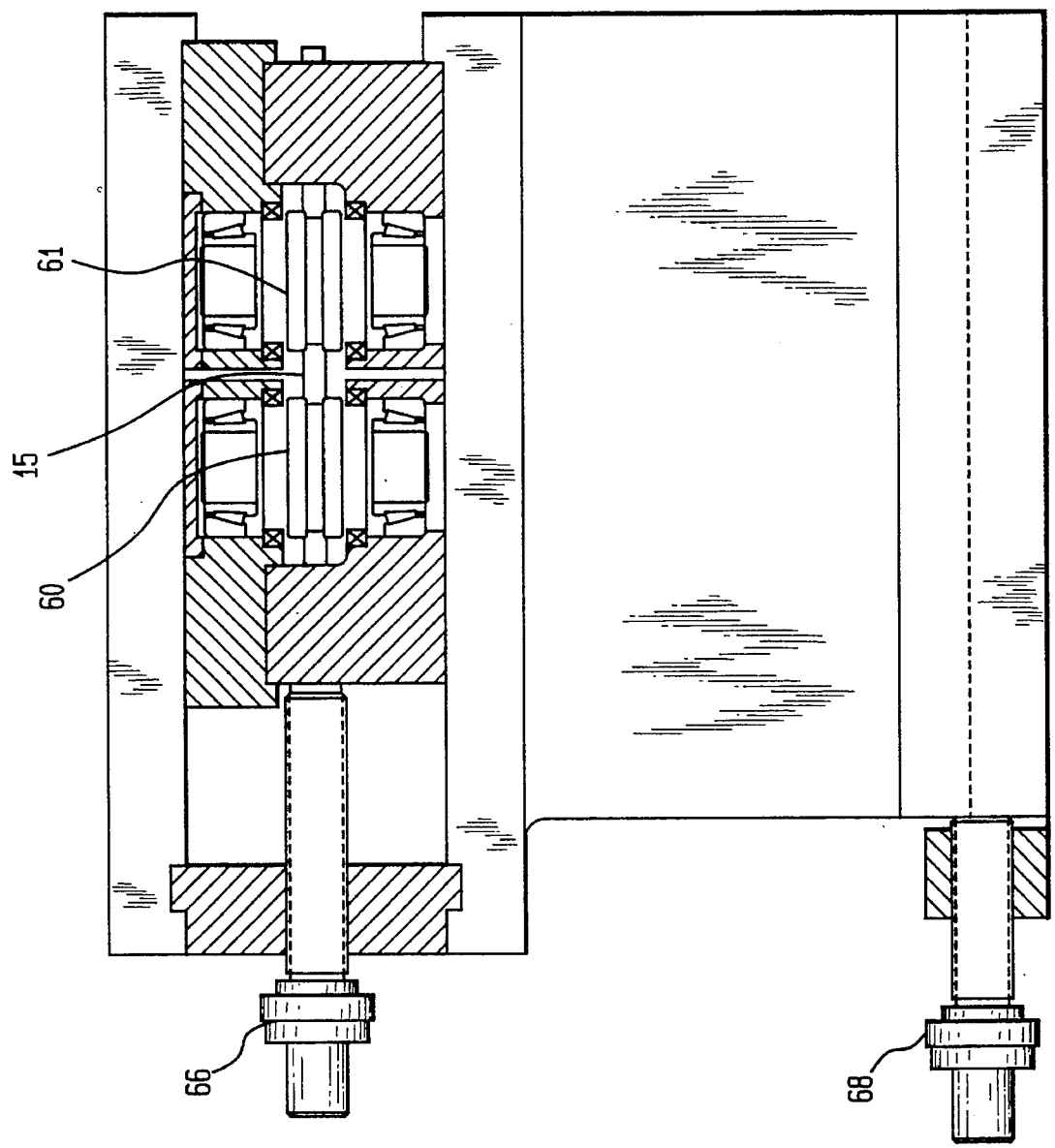
FIG. 4 is a vertical cross-sectional view of a edge conditioning roller apparatus used in the present invention.

Edge conditioning apparatus 24 includes edge rollers 60 and 61, as shown in FIG. 4. Edge rollers 60, 61 are positioned adjacent edges of strip 15. Edge rollers 60, 61 can have grooved surfaces 64. Preferably, edge rollers 60, 61 are square edge rollers or round edge rollers for providing improved width reduction. Edge rollers 60, 61 can be formed of $D_2$ tool steele, HRC 55. Adjusting screw 66 adjusts the distance between edge rollers 60 and 61.

Figure 5:
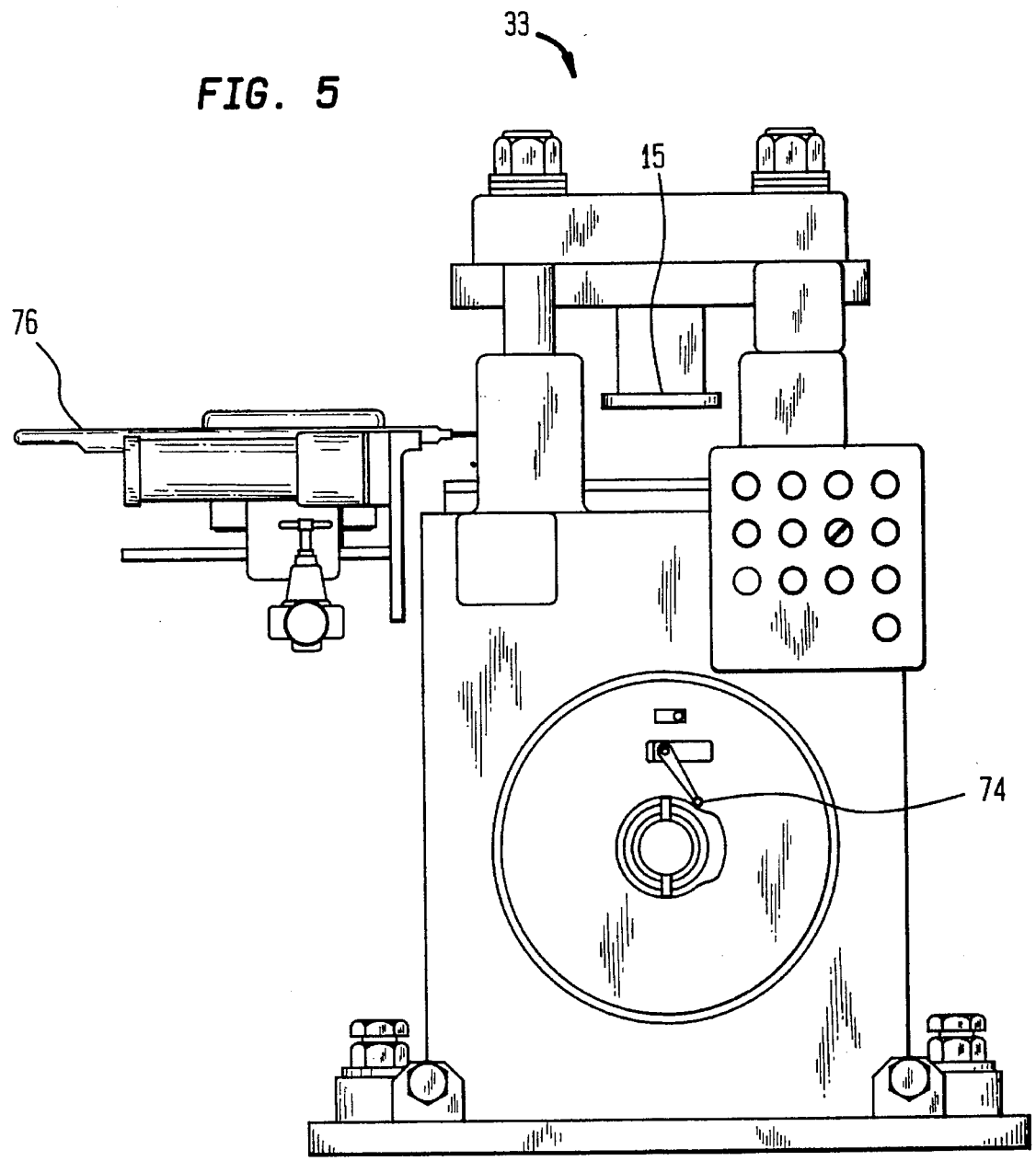
FIG. 5 is a side elevational view of a severing apparatus used in the present invention.

FIG. 5 shows severing apparatus 33 for cutting strip 15 to a predetermined length. Sensor 36 activates lever 74. Shear 77 horizontally cuts strip 15 upon activation by lever 72. Preferably, strip 15 is cut to a length of about 4 feet to about 24 feet. Alternatively, strip 15 can be re-coiled after guide rollers 32 into a cold finished bar flat strip of indefinite length.

FIG. 6 illustrates a vertical cross-sectional view of shaving apparatus 20. Knife blades 19a–19e are arranged along the side edges of strip 15 for removing burrs or slitting fracture from strip 15. Preferable, knife blades 19a–19e are formed of carbide. Groups of teeth 80 and 82 are adjusted by lever 84 for bringing knives 20a towards strip 15. Additional end knife stations can be positioned at the four corners of the strip for removing residual burrs resulting from slitting of sheet 12 into strip 15.

Typically, slitter 13 produces a strip or strip 15 enters pinch rollers 16 with a tolerance of ±0.020 inches. Apparatus for producing bar flats 10 can reduce the thickness and width of strip 15 by ±0.020 inches for producing a cold finished bar flat with the tolerances set forth in the ASTM A108 and ASTM A29 standard.

The present invention has the advantage of providing a cold finished bar flat with smooth upper, lower and edge surfaces and having dimensional accuracy of a cold finished bar flat with high productivity in a continuous process resulting in high economy. The combination of cold finishing rollers with edge conditioning rollers provides for smooth surfaces of the bar. In addition, alternating cold finishing rollers with edge conditioning rollers reduces the bar without introducing internal stress to the bar.

While the invention has been described with reference to the preferred embodiment thereof, it will be appreciated by those of ordinary skill in the art that modifications can be made to the structure and form of the invention without departing from the spirit and scope thereof.

We claim:

1. A method of producing improved cold finished bar flats from a strip of a sheet, said strip including a top surface, bottom surface and edge surfaces on either side of said strip, comprising the steps of:

shaving said edge surfaces of said strip, said strip having a thickness of between 0.125 and 0.50 inches;

first cold finishing for finishing said top and bottom surfaces of said strip with a plurality of pairs of cold finishing rollers;

edge conditioning said edges of said strip with at least one pair of edge conditioning rollers, said at least one pair of edge conditioning rollers is positioned between said plurality of pairs of cold finishing rollers, said cold finishing rollers and said edge conditioning rollers reduce the thickness and width of said strip by ±0.020 inches and hold minimum tolerances of between 0 to −0.002 inches to form said cold finished bar flats having a smooth finish on top, bottom and edge surfaces of said bar flats; and second cold finishing for finishing said top and bottom surfaces of said strip after said edge conditioning step.
2. The method of claim 1 further comprising:
a first leveling step before said shaving step, said leveling step including a plurality of rollers adjacent said top and bottom surfaces of said strip.
3. The method of claim 2 further comprising:

a second leveling step after said second cold finishing step.
4. The method of claim 3 further comprising the step of:
horizontally severing said strip at a predetermined length of said strip.

* * * * *